Aug. 19, 1958  E. G. MATKINS  2,848,650
LIGHT ACTUATED CONTROL CIRCUIT
Filed March 10, 1954  3 Sheets-Sheet 1
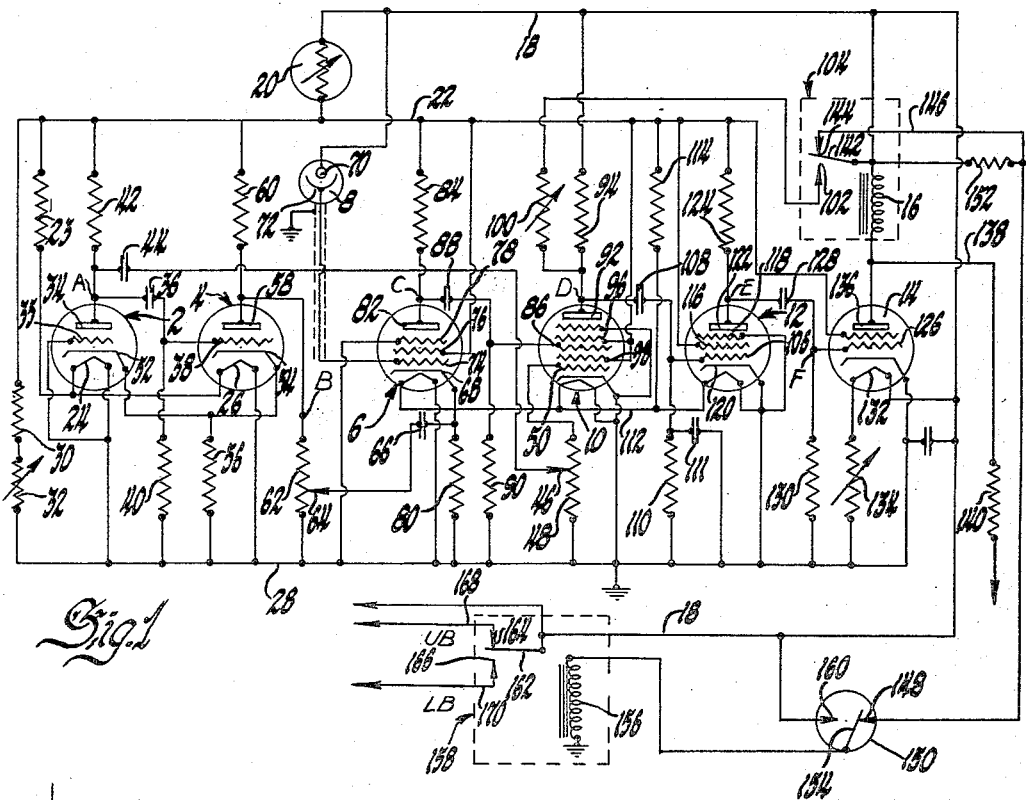
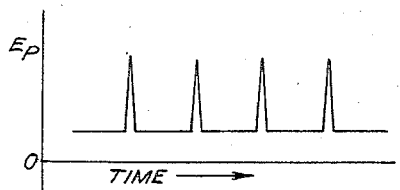
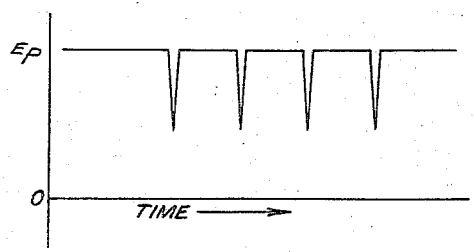
INVENTOR
Eugene G. Matkins
BY
R. E. Fowler
ATTORNEY Aug. 19, 1958 E. G. MATKINS 2,848,650
LIGHT ACTUATED CONTROL CIRCUIT
Filed March 10, 1954 3 Sheets-Sheet 2
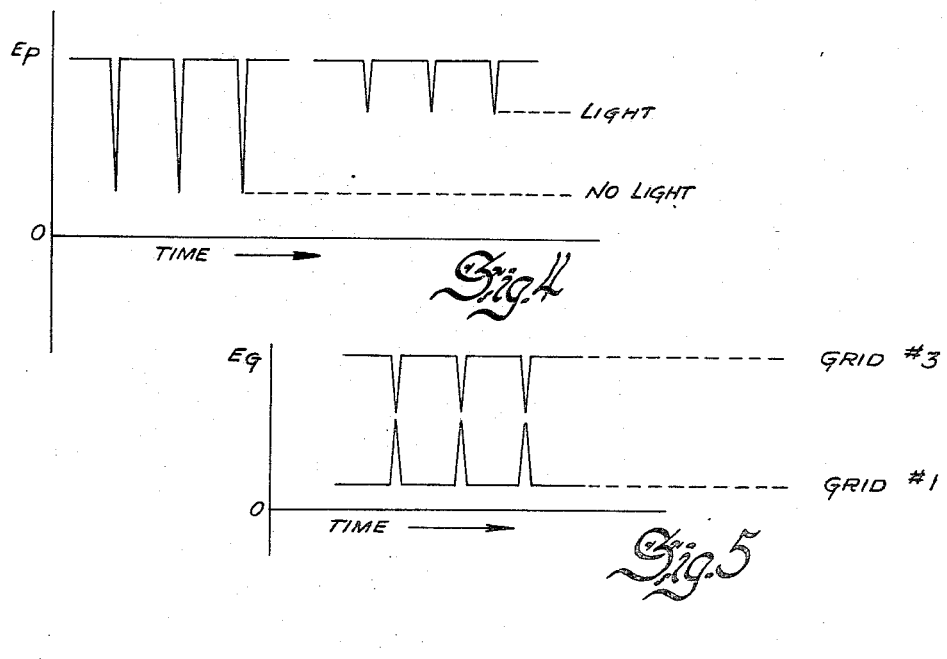
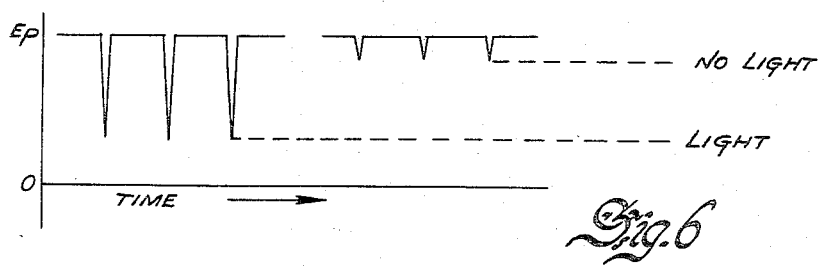
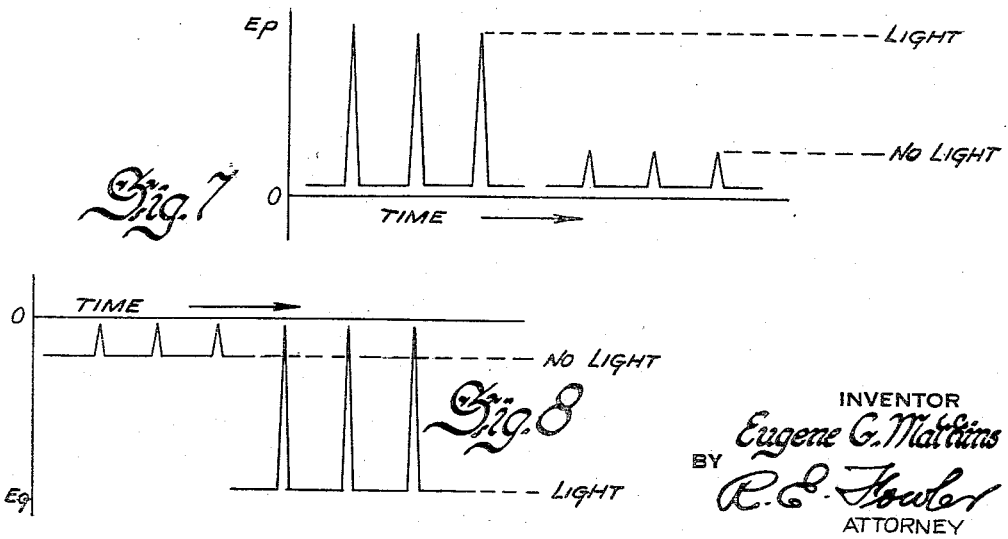
INVENTOR
Eugene G. Matkins
BY
R. E. Fowler
ATTORNEY Aug. 19, 1958     E. G. MATKINS     2,848,650
LIGHT ACTUATED CONTROL CIRCUIT
Filed March 10, 1954     3 Sheets-Sheet 3

INVENTOR
Eugene G. Matkins
BY
R. E. Fowler
ATTORNEY

United States Patent Office 2,848,650
Patented Aug. 19, 1958

2,848,650

LIGHT ACTUATED CONTROL CIRCUIT

Eugene G. Matkins, Reelsville, Ind., assignor to General Motors Corporation, Detroit, Mich., a corporation of Delaware Application March 10, 1954, Serial No. 415,285

8 Claims. (Cl. 315—83)

This invention relates to light sensitive control means or more specifically to means for switching electrical energized means which is actuated by the amount of ambient light.

While this system is adapted to actuate switching means upon a change of light intensity for a large variety of uses it is particularly useful in controlling the beam energization in automobile headlamps. In the operation of an automobile it is necessary to switch from high or long range filaments in the headlamps to low or short range filaments upon the approach of a vehicle from the opposite direction so that the approaching driver may not be temporarily blinded.

It is an object in making this invention to provide a light sensitive control circuit for switching filaments in automotive headlamps dependent upon the amount of light incident upon the front of a vehicle.

It is a further object in making this invention to provide a light sensitive control system for automotive headlamps that is operable from low voltage power throughout.

It is a further object in making this invention to provide a low voltage light responsive control system incorporating an attenuating current amplifier supplied by a mixing means.

With these and other objects in view which will become apparent as the specification proceeds, my invention will be best understood by reference to the following specification and claims and the illustrations in the accompanying drawings, in which:

Figure 1 is a circuit diagram of a light controlled circuit incorporating my invention;

Figure 2 is a graph of the voltage at point A in the circuit;

Figure 3 is a graph of the voltage at point B in the circuit;

Figure 4 is a graph of the voltage at point C in the circuit showing variation between light and no light conditions;

Figure 5 is a graph of the voltages on control grid #1 and #3 of the mixer tube;

Figure 6 is a graph of the plate voltage of the mixer tube at point D showing variations with changes in light;

Figure 7 is a graph of the voltage on the plate of the amplifier tube at point E;

Figure 8 is a graph of the voltage on the grid of the amplifier at point F showing variation due to light changes;

Figure 9:
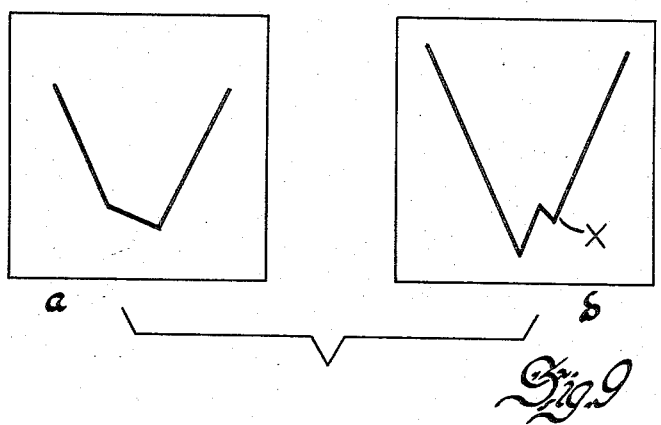
Figure 9 is a graph of the form of the resultant combined control pulse showing satisfactory and unsatisfactory types.

Referring now more particularly to Figure 1, my system consists of a multi-vibrator oscillator, including tubes 2 and 4, which produces a regular series of constant amplitude pulses. A portion of the pulses are fed to a modulation tube 6 whose amplification is controlled by a light sensitive cell 8. The output of the modulator tube 6 and the remaining series of oscillator pulses are fed to the mixer tube 10, the output of which is amplified through two stages represented by tubes 12 and 14 to energize control relay coil 16 connected in the output circuit of the latter.

The oscillator section for producing uniform pulses consists of the two triode sections 2 and 4 and while shown as two separate tubes, a single duo-triode tube may be used. This oscillator is of the multi-vibrator type. Supply line 18 is connected to a suitable source of power such as the storage battery of an automobile. Line 18 is connected to one terminal of a ballast tube 20 for regulating the voltage and the other terminal of the tube is connected to supply line 22 which provides a regulated lower voltage to the circuit. A dropping resistor 23 is connected between supply line 22 and one terminal of each of the filaments 24 and 26 of the tubes 2 and 4. The opposite terminals of the filament are connected to line 28 which is grounded. This supplies power to the filaments. Two resistors 30 and 32, the latter being adjustable, are connected in series between lines 22 and 28 to adjust the voltage which it is desired to maintain on the former.

Plate 34 of the first triode is connected through condenser 36 with the control grid 38 of the second triode and thence through resistor 40 to ground line 28. Plate 34 is also connected through dropping resistor 42 to supply line 22. Plate 34 is further connected through coupling condenser 44 to adjustable tap 46 on resistor 48 in circuit between the first grid 50 of the mixer tube 10 and ground line 28. Cathodes 52 and 54 of tubes 2 and 4 are commonly connected to ground through resistor 56. Control grid 35 of triode 2 is connected to ground line 28.

Plate 58 of triode 4 is supplied with the proper operating voltage from line 22 through resistor 60 connected to both. Plate 58 is likewise connected to ground through bleeder resistor 62. An adjustable tap 64 on resistor 62 is connected through coupling condenser 66 to cathode 68 of the modulator tube 6. Thus the output of oscillator tube 2 is applied to the first grid 50 of the mixer tube 10 while that of the second oscillator tube 4 is connected to the cathode 68 of the modulator tube 6.

The anode 70 of the photocell 8 is connected directly to the supply line 18 and the cathode 72 to the control grid 74 of the modulator tube 6. The screen grid 76 of the tube 6 is connected directly to the regulated power line 22 and the suppressor grid 78 to the ground line 28. Cathode 68 is connected to ground through biasing resistor 80. Plate 82 of tube 6 is supplied with the proper voltage through dropping resistor 84 connected to regulated supply line 22. Plate 82 is coupled to control grid 86 of the mixer tube 10 through condenser 88. Biasing resistor 90 is connected between grid 86 and ground.

The plate 92 of the mixer tube 10 is not supplied with power from the regulated line 22 but is instead connected through resistor 94 with the higher voltage, unregulated line 18. There are two screen grids 96 and 98 in tube 10 which are commonly connected to supply line 22. The plate 92 of tube 10 is connected through variable resistance 100 to a stationary contact 102 of a control relay 104 for purposes to be described.

The output of the mixer tube 10 is applied to the amplifier tube 12. Plate 92 of the mixer is coupled to grid 106 of the amplifier tube through condenser 108. Biasing resistor 110 is connected between grid 106 and ground. Line 112 is commonly connected to the filaments of tubes 6, 10 and 12 to supply power thereto for heating. A dropping resistor 114 is connected between line 112 and power line 22. Screen grid 116 of tube 12 is directly connected to power line 22 and suppressor grid 118 and cathode 120 of tube 12 are commonly connected to ground. Plate 122 is connected to line 22 through resistor 124.

The last stage of the set is a power stage including tube 14. The control grid 126 of this tube is connected to plate 122 of tube 12 through a coupling condenser 128. Resistor 130 is connected between grid 126 and ground. The filament 132 of tube 14 is connected directly to power line 18 and has its remaining terminal connected to ground through variable resistance 134. Plate 136 of the power tube is directly connected to the relay coil 16 and through line 138 and resistor 140 to a conventional manually operated switch (not shown) to override the control system and energize the high beam filaments under any condition.

Armature 142 of the control relay 104 is spring biased upwardly to engage stationary contact 144 but is pulled downward into engagement with contact 102 upon energization of coil 16. Contact 144 is connected through line 146 to stationary contact 148 of a standard foot dimmer switch 150. Armature 142 is connected to one end of coil 16 and through resistor 152 to line 146. The movable arm 154 of the foot dimmer switch 150 is directly connected to one end of the coil 156 of the power relay 158, the opposite end being grounded. A second stationary contact 160 of switch 150 is directly connected to power line 18. Armature 162 of the power relay is connected to line 18 and is adapted to oscillate between two stationary contacts 164 and 166. The armature 162 is spring biased upwardly to engage contact 164 and is pulled down into engagement with contact 166 by the energization of coil 156. Contact 164 is connected by line 168 to the upper beam filaments of a headlamp indicated by "UB" and contact 166 is connected through line 170 with the lower beam filaments indicated as "LB."

The oscillator section comprising tubes 2 and 4 provides two pulses 180° out of phase with each other. The first pulse series, developed at point A, are positive pulses as indicated in Fig. 2. This series of pulses is applied directly to the mixer tube 10 by connection to the first grid 50. The amplitude of the pulses appearing on the grid 50 may be adjusted by varying the position of tap 46. The second half of the oscillator develops a series of pulses 180° out of phase with the first section. Thus Fig. 3 illustrates the negative pulses produced at point B. These pulses are applied to the cathode 68 of the modulator tube 6 and their amplitude is adjusted by the position of the tap 64.

The modulator tube control grid 74 is connected directly to the cathode 72 of a phototube 8. With no light falling on the phototube the grid 74 is biased slightly negative. This is due to accumulating electrons from the cathode which tend to bias it (the grid) negatively. This bias is, however, insufficient to stop conduction in the tube and a negative signal will appear at point C as shown in Fig. 4 labeled "no light." This is in phase with the applied negative signal at the cathode 68.

If, however, light falls on the phototube, the internal resistance of the phototube 8 is decreased and current will flow to the phototube. The flow drives the grid 74 positive with respect to the bias on the grid. This permits more cathode current to flow in tube 6 but does not increase the plate current since the screen grid 76 is closer to the cathode than plate 82 and the screen grid therefor acts as a plate. A large resistor 84 in the plate circuit also tends to limit flow in the plate circuit. There is no resistance in the screen grid circuit so that screen current may increase rapidly. The final result is a decrease in plate current in the tube 6 upon an increase in light upon phototube 8. The graph in Fig. 4 labeled "Light" indicates the pulse series when light falls on the tube 8. Thus the output of the modulation tube 6 is a series of negative pulses whose amplitude vary with the light falling on the phototube, becoming less as the light increases.

The next stage is a mixer stage in which the positive pulses of constant amplitude derived from the oscillator and applied to grid 50 are mixed with the negative light amplitude modulated pulses applied to grid 86. Fig. 5 shows the two series of pulses applied to the mixer tube 10, the upper series being those applied to the third grid 86 and the lower series those applied to the first grid 50. The amplitude of the latter series may be adjusted by moving tap 46 over resistor 48 to make the amplitude of the lower series equal to that of the upper series under the "no light" condition. Both grids control the flow of current through tube 10 and therefore the resultant flow is a result of the combined effect of both. Since under "no light" condition the two signals are equal and opposite they will combined exert substantially no effect on said tube and the result will be a substantially zero signal in the output of the mixer tube.

However, when light falls on the phototube 8, the output of the modulator tube 6 will decrease as shown in Fig. 4 and the negative signal on grid 86 will be smaller. The algebraic sum of the two signals is therefore more positive, producing a larger negative signal in the plate circuit of tube 10. The signals at plate 92 are shown in Fig. 6. The two signals do not cancel completely under "no light" conditions and thus a small pulsating signal is produced as shown in Fig. 6. When light falls on the tube 8, however, this is increased to a large negative pulse. There is thus produced at the output of the mixer stage a negative pulse at oscillator frequency whose amplitude varies proportionately with the amount of light falling on the phototube.

The next stage of the system is an amplifier stage and includes the tube 12, to the control grid 106 of which the output from the plate 92 is applied. This tube inverts the signal and amplifies it. Thus the output of the amplifier stage represented in Fig. 7 is many times that of the input though it is not shown a great deal larger in the drawings. Capacitor 111 connected across resistor 110 controls the "no light" signal and provides a leakage path to ground for bursts of energy introduced into the system such as might be caused by ignition system interference.

The last stage of the system is a power amplifier which controls the operation of the sensitive relay 16. The amplifier signal from plate 122 is applied to grid 126 of tube 14 to control conductance through the tube. Under "no light" conditions there is very little signal applied to grid 126. The bias on this grid is determined by resistance 130. It is designed to be slightly negative at "no light." There will be sufficient flow through the tube 14 at this time to energize the relay coil 16 and attract armature 142. The pulse appearing at the plate 122 of the amplifier 12, as shown in Fig. 7, is positive. It is desired, however, to have this positive pulse develop a sufficiently negative bias on the grid 126 to lower conductance through the tube 14 to a point where the relay 104 will drop its armature. This is accomplished through the following action. As the pulse on plate 122 increases, the coupling condenser 128 is rapidly charged through the grid cathode circuit of tube 14 which acts as a diode rectifier. This path is of lower resistance than resistor 130 and permits this rapid charging to approximately the peak value of the pulse. As the pulse amplitude starts to decrease, condenser 128 starts to discharge through resistor 130 since current cannot flow back from the grid to the cathode. This flow through resistor 130 biases the grid 126 negatively during the discharge cycle. The same action is repeated for each pulse. The capacity-resistance values are so chosen as to give a fairly steady negative bias which is sufficient to cut off the flow in tube 14 when light falls on the phototube to deenergize relay 104. Fig. 8, therefore, illustrates the signals applied to grid 126 of tube 14.

The sensitive relay 104 in the output circuit of power tube 14 controls the power relay 158 which switches the energizing filament circuits in the headlamps. The energizing circuit for the high or upper beams is labeled "UB" and for the short range or lower beam "LB." When the sensitive relay 104 is energized during periods of no light, its armature 142 is pulled into engagement with contact 102 and away from contact 144. Open circuit at contact 144 prevents relay coil 156 from being energized to attract its armature which remains in upper position completing an obvious circuit to the upper beam filaments. At the same time the closure of armature 142 with contact 102 completes a circuit through variable resistor 100, placing that in parallel with plate resistor 94. This is the dim control or adjustment by which the system can be set to switch to low beam upon the receipt of a predetermined intensity of light on the phototube 8. An adjustment of resistor 100 to reduce the total effective resistance in the plate circuit will cause switching at a lower intensity of light and vice versa. This controls only the light level at which the system is switched from bright to dim and does not have any effect on switching back to bright since at that time resistor 100 is not in circuit.

As the intensity of light falling on the phototube 8 increases, it will reach a point, depending on the setting of resistor 100, where sufficient signals are developed in the mixer tube 10 and amplified thereafter to cut off the flow through power tube 14, deenergizing coil 16, and armature 142 will move away from contact 102 and against contact 144. Engagement with contact 144 completes an energizing circuit for relay coil 156 as follows: power line 18, armature 142, contact 144, line 146, contact 148, switch arm 154, coil 156 to ground. This coil, therefore, attracts its armature 162, opening the supply circuit to the upper beam filaments and completing a circuit to the lower beam filaments. The movement of armature 142 simultaneously removes variable dimming control resistor 100 from the circuit.

The system remains in this condition as long as there is sufficient light incident upon the phototube 8. However, as the pulses become smaller due to less incident light, they will reach a point where the negative bias on power tube 14 permits sufficient conductance through the tube to energize coil 16 to attract its armature 142 again. This opens the energizing circuit for relay coil 156 and its armature drops away, switching back to upper beam energization. The adjustment for control of the light level at which the system switches back to high beam is provided by variable resistance 62—64 which adjusts the amplitude of the signal from the modulator tube, which is influenced by incident light. The system is so adjusted that a much smaller amount of light will hold the power relay on low beam than that required to move it to that position, so that the system will remain on low beam when the amount of incident light is reduced due to an approaching vehicle dimming its headlamps.

If the system has been switched to low beam position and the oncoming vehicle does not respond by dimming his headlamps, an overriding circuit is provided to bring the system back to upper beam illumination. This is circuit 138 and series resistor 140 which are connected to a manually actuating grounding switch (not shown). This provides a circuit directly through the relay coil 16 to ground and energization of that coil to maintain the switch in non-energizing position for the power relay for upper beam operation. Thus as long as the manual switch is closed, relay coil 16 will be energized and the lights on upper beam.

In this type of system where pulses 180° out of phase are combined and the amplitude of one series of pulses is constant while the amplitude of the opposing set is varied in proportion to a given condition, it has been found that system operation is much more satisfactory if the amplitude of the fixed pulse is designed to be smaller or shorter than the light regulated pulse when the latter is at its maximum amplitude. The reason for this is in the wave form of the resultant combined pulse and is best illustrated in Fig. 9. The wave form Fig. 9a is produced when the pulses are of approximately the same length but the light regulated ones are slightly longer than the fixed amplitude pulses. This provides a satisfactory control of pulse, whereas if the fixed amplitude pulses are longer than the light regulated ones, a pip such as shown at X in Fig. 9b is produced which moves along the side of the resultant pulse hiding the output when variation should be applied. Maintaining the fixed pulses shorter by design to obtain the wave form shown in Fig. 9a will produce more satisfactory operation.

Figure 10:
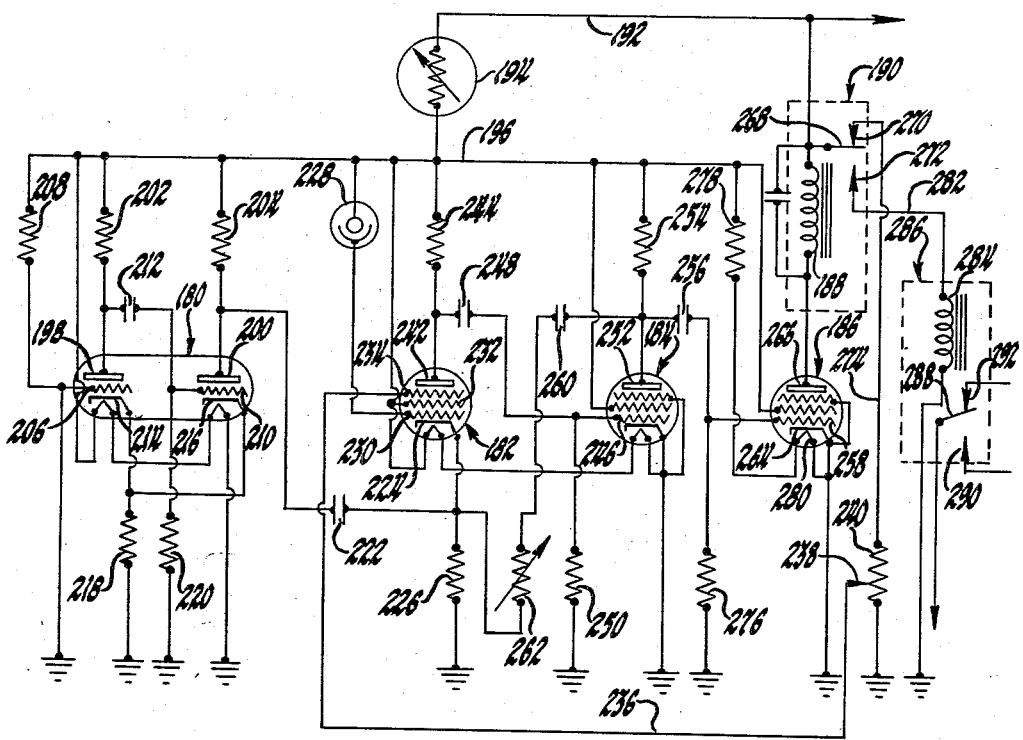
Figure 10 is a circuit diagram of a light sensitive control system embodying a modified form of my invention.

The control system shown in Fig. 1 may be defined as of the dark actuated type or one in which the sensitive relay is energized and the last power tube conducts when no light falls on the phototube. Fig. 10 discloses a modified form of my invention which is of the reverse type in that the sensitive relay is energized and the power tube conducts when light falls on the phototube.

In this form there is provided a multivibrator stage including a duo-triode tube 180, a gating or modulating stage including tube 182, an amplifying stage including tube 184 and a power stage including tube 186. As in Fig. 1 a coil 188 of a sensitive relay 190 is connected in the output circuit of the power stage. The present form of control system is designed to operate from a low voltage source such as a conventional storage battery. Supply line 192 is therefore adapted to be connected to such a source. It is directly connected to one terminal of a ballast tube 194 to regulate the voltage. The opposite terminal of the ballast tube is connected to power supply line 196 which supplies regulated voltage to the system. Variable resistor 208 is connected between line 196 and ground to adjust the voltage on line 196.

The multivibrator includes the two triode sections of tube 180, the plates 198 and 200 of which are connected to supply line 196 through dropping resistors 202 and 204 respectively. Control grid 206 of the first section is connected to ground. The control grid 210 of the second section is coupled to plate 198 through a condenser 212. The cathodes 214 and 216 of the two sections are commonly connected to ground through resistance 218. Resistance 220 is connected between grid 210 and ground.

The output of the multivibrator is applied to the gating tube through coupling condenser 222 between plate 200 and the cathode 224 of the gating tube 182. Biasing resistor 226 is connected between the cathode 224 and ground. A photocell or tube 228 is connected directly to regulated power supply line 196 and control grid 230 of the gating tube. Screen grid 232 is connected directly to the supply line 196 and the suppressor grid 234 through line 236 to an adjustable tap 238 on resistor 240. Plate 242 of tube 182 is connected to the supply line 196 through dropping resistor 244.

The next stage includes amplifying tube 184 whose control grid 246 is coupled to plate 242 of the gating tube through condenser 248. Biasing resistor 250 is connected between grid 246 and ground. Plate 252 of tube 184 is connected through resistors 254 to supply line 196 and through coupling condenser 256 to control grid 258 of the power tube 186. A feedback circuit is shown which interconnects the plate 252 with cathode 224 of the gating tube 182. This connection includes condenser 260 in series with a variable resistor 262.

The cathode 264 of the power tube is grounded. Plate 266 is directly connected to coil 188 which is in turn connected to unregulated power line 192. Armature 268 of the relay 190 is biased against upper contact 270 but may be pulled down into engagement with the lower contact 272 when the coil 188 is energized. Contact 270 is connected by line 274 to the adjustable resistance 240, the opposite terminal of which is grounded.

Biasing resistor 276 is connected between control grid 258 and ground. Dropping resistor 278 is connected between the regulated power line 196 and the filament 280 of the tube 186 to supply power thereto. The opposite side of the filament is grounded.

Stationary contact 272 of the relay 190 is directly connected through line 282 with coil 284 of the power or operating relay 286. The opposite terminal of the coil is grounded. Movable armature 288 is spring biased downwardly into engagement with stationary contact 290 connected directly to the upper beam filaments indicated by "UB." When the coil 284 is energized, however, the armature 288 is pulled into engagement with stationary contact 292, which is directly connected to the lower beam filaments labeled "LB." The armature 288 is directly connected to the power source or to line 192.

The circuit shown in Fig. 10 is of the type in which the sensitive relay 190 is deenergized when no light falls on the phototube and energized when light is present.

In the operation of this system a series of substantially constant amplitude negative pulses are fed to cathode 224 of tube 182 from plate 200 of the multivibrator. The output signal on the plate 242 of the tube 182 is a negative pulse whose amplitude depends upon the bias on the control grid 230 which is determined in turn by the amount of light falling on the photocell 228. The amplitude of the output signal from tube 182 decreases with an increase in light on the phototube. The amplifier stage next following, including tube 184, reverses the phase, and therefore positive pulses appear in its plate circuit which decrease in amplitude with an increase in light on the photocell. These positive pulses are applied to the control grid 258 of the power tube 186. When no light falls on the photocell and the positive pulses are relatively large, the conductance of the tube 186 is insufficient to cause armature 268 to be attracted, and the power relay coil is deenergized. Armature 288 remains in its lower position and the upper beam filaments are energized through an obvious circuit.

When light falls on the photocell the amplitude of the positive pulses on grid 258 will diminish, reaching a point at which tube conduction will be sufficient to energize coil 188 to attract armature 268 into engagement with contact 272, completing a circuit to power relay coil 284. This attracts armature 288 and moves it from back contact 290 and into engagement with front contact 292. This breaks the supply circuit to the upper beam filaments and completes a circuit to the lower beam filaments.

This system has a feedback circuit from the plate 252 of the amplifier tube 184 back to the cathode 224 of the gating tube 182 for control purposes. This circuit includes coupling condenser 260 and variable resistor 262. Through this circuit part of the positive pulse signal appearing on the plate 252 is fed back to the cathode 224. This opposes the negative pulse signal supplied to the cathode by the oscillator and therefore controls the gain of the gating tube 182 by controlling the cathode signal. This controls the sensitivity of the whole system and therefore that point in the light scale that the device will return to high beam. The variable resistor 262 is called the "hold" control.

A second variable resistor is provided at 240 to adjust the point at which the system will dim when increasing incident light falls on the phototube 228. This also controls the sensitivity of tube 182 by varying the potential on the suppressor grid 234. This resistor is only connected to the power supply during no light condition and only affects the conduction of the gating tube to switch to dim. It has no effect on the system in switching back to high beam. This resistor is referred to as the "dim" control. By adjusting these two controls the proper ratio between the point at which the system switches to dim and that at which it returns to high beam may be obtained.

I claim:

1. In a light controlled system, a source of electrical power, an oscillator connected thereto developing oppositely phased signals at different points, an electron tube having a plurality of control elements, one control element being connected to one point in the oscillator, a light sensitive cell connected to a second control element of the tube and to the source of electrical power to vary the conductance through said tube dependent upon the amount of light falling on said cell, a second electron tube having a plurality of control elements, one element being connected to said oscillator at a different point to receive an oppositely phased signal, the output of said first tube being connected to a second control element of the second tube so that the output of the second tube is affected both by the oppositely phased signals of the oscillator and the amount of light falling on the sensitive cell to provide a resultant control signal proportional to the light falling on the sensitive cell.

2. In a light controlled system, a source of electrical power, a multi-vibrator for producing two series of pulses of opposite phase at different points, a first multi-element electron tube having one element connected to one point in the multi-vibrator to receive one series of pulses, a light sensitive cell connected to the source of electrical power and to another of the elements of the first electron tube to modulate the flow through said tube in accordance with the amount of light falling on said cell, a second multi-element electron tube having one element connected to a second point in the multi-vibrator to receive the second series of pulses and a second element connected to the output of the first tube to produce a resultant signal in the output of the second electron tube which is a combination of the multi-vibrator action and light variation.

3. In a light controlled system, a source of electrical power, a multi-vibrator connected thereto having two sections producing two series of pulses out of phase, a first electron tube having a cathode, control grid and plate, means for connecting the cathode to one section of the multi-vibrator to receive the pulse, a light sensitive cell connected to the control grid and to the source of electrical power to modulate the flow through said tube as the light on the cell changes, a second electron tube having a plurality of grids, one grid being connected to said other section of the multi-vibrator to receive the pulse therefrom and a second grid connected to the output of the first tube so that opposing series of pulses are impressed on the second tube, one series being of constant amplitude and the second opposing series having an amplitude dependent upon light on the cell producing a resultant series of light modulated pulses in the output of the second tube.

4. In a light controlled system, a source of electrical power, a multi-vibrator connected to said source of power having two sections which produce a series of pulses of opposite phase, a multi-element electron tube having a plurality of grids, two of said grids being connected to the two sections of the multi-vibrator to feed the two series of pulses to different grids in the tube, and means for varying the amplitude of one series of pulses in accordance with the ambient light in the vicinity of the apparatus.

5. In a light controlled system, a source of electrical power, a multi-vibrator connected to said source of power having two sections which produce a series of pulses of opposite phase, a multi-element electron tube having a plurality of grids, two of said grids being connected to the two sections of the multi-vibrator to feed the two series of pulses to different grids in the tube, and light sensitive means connected to vary the amplitude of one series of pulses dependent upon incident light and amplitude adjusting means in the connections to each grid to adjust the size of the pulses so that when no light falls on the sensitive means the two series of pulses will cancel each other and there will be no signal in the tube output but increasing light will alter the balance to provide a signal of varying amplitude dependent upon the amount of light.

6. In a light controlled system, a source of electrical power, a multi-vibrator connected to said source having two sections, each of which produces a series of pulses which series are 180° out of phase, a multi-element electron tube having a plurality of grids, one of which is connected to one section of the multi-vibrator to receive the pulses therefrom, a modulator tube having a cathode, plate and grid, said cathode being connected to said other multi-vibrator section to receive pulses, a light sensitive cell connected to the grid of the modulator tube and to the source of power to vary the flow through the modulator tube dependent upon incident light falling on said cell, said modulator plate being connected to a grid of the first-named tube so that both the multi-vibrator direct and modulated out of phase pulses control the output of the first-named tube, and a variable resistor in the connection between the cathode of the modulator tube and the multi-vibrator to adjust the signal amplitude fed thereto.

7. In a light controlled system, a source of electrical power, a multi-vibrator connected to said source having two sections, each of which produces a series of pulses which series are 180° out of phase, a multi-element electron tube having a plurality of grids, one of which is connected to one section of the multi-vibrator to receive the pulses therefrom, a modulator tube having a cathode, plate and grid, said cathode being connected to said other multi-vibrator section to receive pulses, a light sensitive cell connected to the grid of the modulator tube and to the source of power to vary the flow through the modulator tube dependent upon incident light falling on said cell, said modulator plate being connected to a grid of the first-named tube so that both the multi-vibrator direct and modulated out of phase pulses control the output of the first-named tube, a variable resistor in the connection between the cathode of the modulator tube and the multi-vibrator to adjust the signal amplitude fed thereto, a relay coil connected to the output of the first-mentioned electron tube, switching means actuated by the coil connected to apparatus to be controlled, and a second variable resistor connected between the switching means and the output of the first-named tube to vary the resistance in the output circuit and thus the sensitivity of the system to incident light.

8. In a control system for automotive headlamps having upper and lower beam filaments, a source of electrical power, switching means connected thereto and to the filaments to alternately energize the different filaments, magnetic coil means for actuating the switching means, an oscillator connected to the source of power producing oppositely phased signals at different points, a multi-grid tube having one grid connected to the oscillator output at one point, a modulator tube connected to the oscillator output at another point and having a grid, a light sensitive cell connected to the grid of the modulator tube and to the source of electrical power to control the conductance through the modulator tube, the output of the modulator tube being connected to another grid of the first-named tube, amplifying means connected to the output of the first-named tube and to the magnetic coil to control the operation of the switching means, means to vary the input to the modulator tube from the oscillator, means to vary the input to the first-named tube from the oscillator, and a variable resistance connected between the switching means and the output of the first-named tube to control the flow therethrough and thus the sensitivity of the system between switch positions.

References Cited in the file of this patent

UNITED STATES PATENTS

| | | |
|---|---|---|
| 2,424,933 | Kalmus | July 29, 1947 |
| 2,507,436 | Dole, Jr. | May 9, 1950 |